(12) United States Patent
Yu et al.

(10) Patent No.: US 10,211,483 B2
(45) Date of Patent: Feb. 19, 2019

(54) ADDITIVE FOR NON-AQUEOUS ELECTROLYTE, NON-AQUEOUS ELECTROLYTE COMPRISING THE SAME, AND LITHIUM SECONDARY BATTERY COMPRISING THE SAME

(71) Applicant: LG Chem, Ltd., Seoul (KR)

(72) Inventors: Sung Hoon Yu, Daejeon (KR); Hyun Yeong Lee, Daejeon (KR); Yoo Sun Kang, Daejeon (KR); Kyung Mi Lee, Daejeon (KR)

(73) Assignee: LG Chem, Ltd. (KR)

( * ) Notice: Subject to any disclaimer, the term of this patent is extended or adjusted under 35 U.S.C. 154(b) by 185 days.

(21) Appl. No.: 15/341,193

(22) Filed: Nov. 2, 2016

(65) Prior Publication Data

US 2017/0125847 A1    May 4, 2017

(30) Foreign Application Priority Data

Nov. 3, 2015 (KR) .................. 10-2015-0154070

(51) Int. Cl.
| | | |
|---|---|---|
| H01M 10/05 | (2010.01) | |
| H01M 10/0567 | (2010.01) | |
| H01M 10/0525 | (2010.01) | |
| H01M 10/0568 | (2010.01) | |
| H01M 10/0569 | (2010.01) | |

(52) U.S. Cl.
CPC ... *H01M 10/0567* (2013.01); *H01M 10/0525* (2013.01); *H01M 10/0568* (2013.01); *H01M 10/0569* (2013.01); *H01M 2300/0025* (2013.01)

(58) Field of Classification Search
None
See application file for complete search history.

(56) References Cited

U.S. PATENT DOCUMENTS 10,026,992 B2 * 7/2018 Yu ................. H01M 10/0525
2015/0229003 A1    8/2015 Lim et al.

FOREIGN PATENT DOCUMENTS

KR    10-2015-0024225    *    3/2015
KR    20150094088 A    8/2015

OTHER PUBLICATIONS

KR—10-2015-0024225 English machine translation (Year: 2015).*

* cited by examiner

*Primary Examiner* — Scott J. Chmielecki
(74) *Attorney, Agent, or Firm* — Lerner, David, Littenberg, Krumholz & Mentlik, LLP

(57) ABSTRACT

The present invention relates to an additive for a non-aqueous electrolyte solution, which has an excellent effect of adsorbing metal ions dissolved from a positive electrode, a non-aqueous electrolyte solution for a lithium secondary battery including the same, and a lithium secondary battery including the non-aqueous electrolyte solution.

12 Claims, 2 Drawing Sheets

ADDITIVE FOR NON-AQUEOUS ELECTROLYTE, NON-AQUEOUS ELECTROLYTE COMPRISING THE SAME, AND LITHIUM SECONDARY BATTERY COMPRISING THE SAME

CROSS-REFERENCE TO RELATED APPLICATIONS

This application claims the benefit of Korean Patent Application No. 10-2015-0154070, filed on Nov. 3, 2015, in the Korean Intellectual Property Office, the disclosure of which is incorporated herein in its entirety by reference.

TECHNICAL FIELD

The present invention relates to an additive for a non-aqueous electrolyte solution, a non-aqueous electrolyte solution including the same, and a lithium secondary battery including the non-aqueous electrolyte solution, and more particularly, to an additive for a non-aqueous electrolyte solution which may improve performance while also securing stability at a high voltage, a non-aqueous electrolyte solution comprising the same, and a lithium secondary battery comprising the non-aqueous electrolyte solution.

BACKGROUND ART

Recently, interests in energy storage technologies have been increasingly grown, and, while the application of the energy storage technologies is expanded to mobile phones, camcorders, notebook PCs, and even to electric vehicles, efforts for research and development of electrochemical devices have been gradually materialized.

The electrochemical devices have received most attention in this respect, and there emerges an interest in rechargeable secondary batteries among these electrochemical devices. Particularly, among the currently used secondary batteries, lithium secondary batteries, developed in the early 1990's, are spotlighted because the lithium secondary batteries may have higher operating voltage and significantly higher energy density.

The lithium secondary batteries are composed of a negative electrode formed of such as a carbon material capable of intercalating and deintercalating lithium ions, a positive electrode formed of such as a lithium-containing oxide, and a non-aqueous electrolyte solution.

The lithium secondary batteries may be categorized into a lithium ion liquid battery (LiLB) using a liquid electrolyte, a lithium ion polymer battery (LiPB) using a gel-type polymer electrolyte, and a lithium polymer battery (LPB) using a solid polymer electrolyte according to a type of the electrolyte used.

Recently, as the application range of the lithium secondary batteries has expanded, there is a growing demand for lithium secondary batteries which may be safely charged even at a high voltage while maintaining excellent cycle life characteristics even in more harsh environments such as a high temperature or low temperature environment and high-voltage charging.

However, the lithium secondary battery using a liquid electrolyte may have limitations in that a structure of the battery may be deformed due to the generation of gas caused by the oxidation of the electrolyte during long-term storage at high temperatures, or fire and explosion of the battery may occur due to internal heating caused by overcharging. For example, a positive electrode structure collapses while the voltage increases during the overcharging, and accordingly, the negative electrode is degraded while metal ions dissolved from the surface of the positive electrode are electrodeposited on the negative electrode. Such a battery performance degradation phenomenon tends to be more accelerated when the potential of the positive electrode is increased or the battery is exposed at high temperatures.

In order to address the above-described limitations, a method has been proposed in which a material, which protects the positive electrode by forming a film on the positive electrode, is added to the electrolyte solution.

DISCLOSURE OF THE INVENTION

Technical Problem

An aspect of the present invention provides an additive for a non-aqueous electrolyte solution which may improve overcharge safety of the electrolyte solution.

Another aspect of the present invention provides a non-aqueous electrolyte solution for a lithium secondary battery which comprises the additive for a non-aqueous electrolyte solution.

Another aspect of the present invention provides a lithium secondary battery in which cycle characteristics and high-temperature storage performance are improved even during high-voltage charging by comprising the above non-aqueous electrolyte solution.

Technical Solution

According to an aspect of the present invention, there is provided an additive for a non-aqueous electrolyte solution including at least one compound selected from the group consisting of compounds represented by Formulae 1 and 2:

[Formula 1]

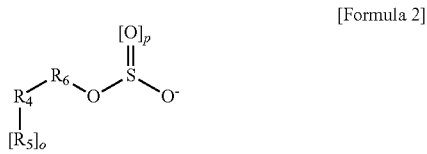

[Formula 2]

in Formula 1 or 2, $R_1$ and $R_4$ are each independently a substituted or unsubstituted alkylene group having 1 to 5 carbon atoms; a substituted or unsubstituted cycloalkylene group having 3 to carbon atoms; a substituted or unsubstituted heterocycloalkylene group having 3 to 8 carbon atoms which includes at least one heteroatom; or a substituted or unsubstituted heterocycloalkenylene group having 5 to 8 carbon atoms which includes at least one heteroatom;

$R_2$ and $R_5$ are each independently a substituted or unsubstituted alkyl group having 1 to 5 carbon atoms; a substituted or unsubstituted cycloalkyl group having 3 to 8 carbon atoms; a substituted or unsubstituted heterocycloalkyl group having 3 to 8 carbon atoms which includes at least one heteroatom; or a substituted or unsubstituted heterocycloalkenyl group having 5 to 8 carbon atoms which includes at least one heteroatom;

the heteroatom is at least one selected from nitrogen (N) or oxygen (O), $R_3$ and $R_6$ are each independently a substituted or unsubstituted alkylene group having 2 to 6 carbon atoms, or a substituted or unsubstituted alkenylene group having 2 to 6 carbon atoms which has at least one double bond, n and o are each independently an integer of 0 or 1, and m and p are each independently an integer of 1 or 2.

Specifically, in Formula 1 or 2, $R_1$ and $R_4$ are each independently a substituted or unsubstituted heterocycloalkenyl group having 5 to 8 carbon atoms which includes at least one heteroatom, wherein n and o may be 0.

According to another aspect of the present invention, there is provided a non-aqueous electrolyte solution for a lithium secondary battery including an ionizable lithium salt; an organic solvent; and the additive for a non-aqueous electrolyte solution.

According to another aspect of the present invention, there is provided a lithium secondary battery including a negative electrode, a positive electrode, a separator disposed between the negative electrode and the positive electrode, and the non-aqueous electrolyte solution of the present invention.

Advantageous Effects

Since the present invention provides an additive for a non-aqueous electrolyte solution which may suppress a decomposition reaction of the electrolyte solution by forming a more stable ionic conductive film on the surface of a positive electrode, a lithium secondary battery having improved cycle life characteristics and high-temperature storage safety at high temperature and high voltage may be prepared by suppressing the decomposition reaction of the electrolyte solution.

MODE FOR CARRYING OUT THE INVENTION

Figure 1:
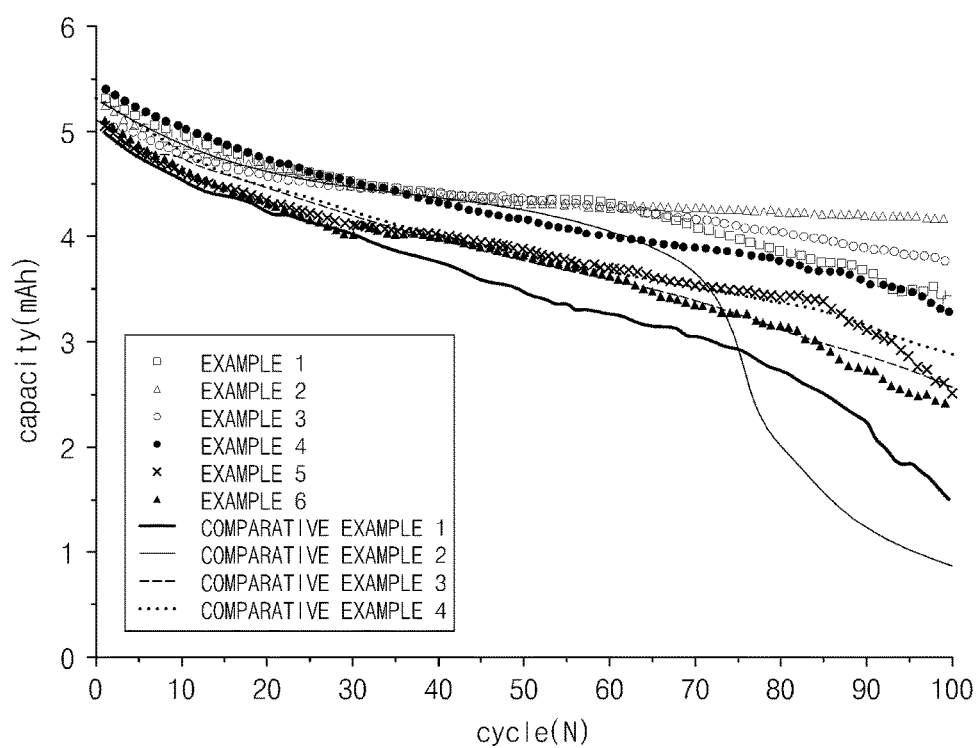
FIG. 1 is a graph illustrating life characteristics of lithium secondary batteries according to Experimental Example 1 of the present invention.

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

As described above, when the overcharge of a secondary battery occurs, a structure of a positive electrode active material becomes unstable while an excessive amount of lithium ions are discharged from a positive electrode. A decomposition reaction of an electrolyte solution occurs while oxygen is discharged from the positive electrode active material having the unstable structure. Particularly, under a high temperature condition, the dissolution of metal ions from the positive electrode may be increased, and performance of the battery may be degraded when the metal ions are precipitated on a negative electrode.

Thus, an embodiment of the present invention aims at providing an additive for a non-aqueous electrolyte solution which may improve overcharge safety of the electrolyte solution.

Also, the present invention provides a non-aqueous electrolyte solution for a lithium secondary battery comprising the additive for a non-aqueous electrolyte solution.

Furthermore, the present invention provides a lithium secondary battery in which cycle characteristics and high-temperature storage performance are improved even during high-voltage charging by comprising the above non-aqueous electrolyte solution.

Specifically, an embodiment of the present invention provides an additive for a non-aqueous electrolyte solution which includes at least one compound selected from the group consisting of compounds represented by Formulae 1 and 2 below:

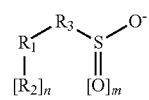

[Formula 1]

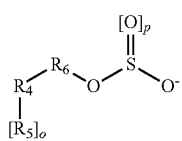

[Formula 2]

in Formula 1 or 2, $R_1$ and $R_4$ are each independently a substituted or unsubstituted alkylene group having 1 to 5 carbon atoms; a substituted or unsubstituted cycloalkylene group having 3 to 8 carbon atoms; a substituted or unsubstituted heterocycloalkylene group having 3 to 8 carbon atoms which includes at least one heteroatom; or a substituted or unsubstituted heterocycloalkenylene group having 5 to 8 carbon atoms which includes at least one heteroatom;

$R_2$ and $R_5$ are each independently a substituted or unsubstituted alkyl group having 1 to 5 carbon atoms; a substituted or unsubstituted cycloalkyl group having 3 to 8 carbon atoms; a substituted or unsubstituted heterocycloalkyl group having 3 to 8 carbon atoms which includes at least one heteroatom; or a substituted or unsubstituted heterocycloalkenyl group having 5 to 8 carbon atoms which includes at least one heteroatom;

the heteroatom is at least one selected from nitrogen (N) or oxygen (O), $R_3$ and $R_6$ are each independently a substituted or unsubstituted alkylene group having 2 to 6 carbon atoms, or a substituted or unsubstituted alkenylene group having 2 to 6 carbon atoms which has at least one double bond, n and o are each independently an integer of 0 or 1, and m and p are each independently an integer of 1 or 2.

Specifically, in Formula 1 or 2, $R_1$ and $R_4$ are each independently a substituted or unsubstituted heterocycloalkenyl group having 5 to 8 carbon atoms which includes at least one heteroatom, wherein n and o may be 0.

Specifically, the additive for a non-aqueous electrolyte solution may comprise at least one compound selected from the group consisting of compounds represented by Formulae 1a to 1c below.

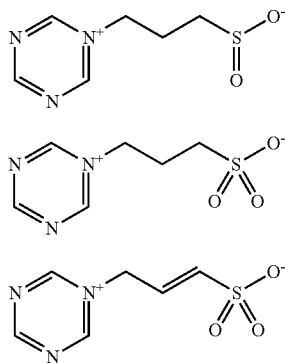

[Formula 1a]

[Formula 1b]

[Formula 1c]

In general, during initial charging of a secondary battery, a solid electrolyte interface (SEI) film affecting a battery reaction is formed on a surface of a negative electrode (graphite) while an electrolyte solution is decomposed before lithium ions discharged from a positive electrode are inserted into the negative electrode (graphite). The SEI film not only has properties of passing the lithium ions and blocking the movement of electrons, but also plays a role as a protective film which prevents the continuous decomposition of the electrolyte solution. However, performance of the formed SEI film may be difficult to be continuously maintained, and the SEI film may be destroyed by shrinkage and expansion due to repeated charge/discharge cycles or may be destroyed by external impact and heat. While the SEI film thus destroyed is restored by the continuous charge and discharge process, the charge is additionally or irreversible consumed to result in a continuous decrease in reversible capacity. Particularly, since interface resistance is increased as the thickness of the solid interface film formed by the decomposition of the electrolyte solution is increased, battery performance is degraded.

The additive for a non-aqueous electrolyte solution, which includes at least one compound selected from the group consisting of the compounds represented by Formula 1 or 2 including a heteroatom, of the present invention may form a stable ionic conductive film on a surface of the positive electrode when a predetermined voltage is reached during the charging and discharging. Since the ionic conductive film prevents the dispersion of metal ions dissolved from a positive electrode active material, the ionic conductive film suppresses the decomposition reaction of the electrolyte solution by preventing the contact between the positive electrode and the electrolyte solution. Also, since the additive for a non-aqueous electrolyte solution of the present invention includes a functional group such as a sulfur atom (S) or an oxygen-substituted sulfur atom (S), salt anions are stabilized by unshared electron pairs, and thus, the decomposition reaction of the electrolyte solution may be suppressed. Particularly, the additive for a non-aqueous electrolyte solution of the present invention may suppress the movement of the metal ions dissolved from the positive electrode to the negative electrode by adsorbing the metal ions even in a state in which the film is not formed. Thus, since the additive for a non-aqueous electrolyte solution may improve safety of the secondary battery during overcharging and may effectively suppress the decomposition reaction of the electrolyte solution even during high-temperature storage, a lithium secondary battery having improved cycle characteristics may be prepared.

In this case, with respect to the compound of Formula 1b among the compounds represented by formulae 1a to 1c which are included in the additive for a non-aqueous electrolyte solution of the present invention, a negative charge is delocalized at three oxygen atoms, but, with respect to the compound of Formula 1a, since a negative charge is delocalized at two oxygen atoms, the negative charge on oxygen is stronger than that of the compound of Formula 1b. Thus, since an effect of adsorbing the metal ions dissolved from the positive electrode of the compound of Formula 1a is better than that of the compound of Formula 1b, an effect of forming an ionic conductive film on the surface of the positive electrode is better. Also, since the compound of Formula 1c further includes double bonds capable of forming a film on the surface of the negative electrode in the carbon bond in comparison to the compound of Formula 1b, an ionic conductive film formation effect may be better.

Also, the additive for a non-aqueous electrolyte solution may comprise a compound represented by Formula 2a.

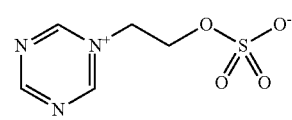

[Formula 2a]

Also, an embodiment of the present invention provides a non-aqueous electrolyte solution for a lithium secondary battery including an ionizable lithium salt; an organic solvent; and an additive for a non-aqueous electrolyte solution, wherein the additive for a non-aqueous electrolyte solution includes at least one compound selected from the group consisting of the compounds represented by Formula 1 or 2.

In this case, the additive for a non-aqueous electrolyte solution may be included in an amount of about 0.5 wt % to about 6 wt %, particularly 1 wt % to 5 wt %, based on a total weight of the non-aqueous electrolyte solution. When the amount of the additive is less than 0.5 wt %, stabilizing effect of the SEI is insufficient. Also, when the amount of the additive is greater than 6 wt %, for example, when the amount of the additive is about 7 wt %, since solubility of the additive for a non-aqueous electrolyte solution in the electrolyte solution is reduced, there is a risk of precipitation due to sedimentation. Thus, an impedance measurement may not only be impossible, but a thickness of the film formed may also be increased. However, since uniformity is reduced, it is predicted that resistance is increased.

In the non-aqueous electrolyte solution of the present invention, the lithium salt, which is included as an electrolyte, may be used without limitation so long as it is typically used in an electrolyte solution for a lithium secondary battery. For example, the lithium salt may include $Li^+$ as a cation, and may include any one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2$ $(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion. The lithium salt may be used alone or in a mixture of two or more thereof, if necessary. The lithium salt may be appropriately changed in a normally usable range, but may be included in a concentration of 0.8 M to 1.5 M in the electrolyte solution in order to obtain an optimum corrosion protection film formation effect on the surface of the electrode.

Also, the organic solvent included in the non-aqueous electrolyte solution of the present invention may be used without limitation so long as it is typically used in an electrolyte solution for a lithium secondary battery, and, for example, an ether compound, an ester compound, an amide compound, a linear carbonate compound, or a cyclic carbonate compound may be used alone or in a mixture of two or more thereof. Among these compounds, the cyclic carbonate compound, the linear carbonate compound, or a mixture thereof may be typically included.

Specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof. Also, specific examples of the linear carbonate compound may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, but the present invention is not limited thereto.

In particular, since ethylene carbonate and propylene carbonate, as cyclic carbonates among the carbonate-based organic solvents, are highly viscous organic solvents and have high dielectric constants, the ethylene carbonate and propylene carbonate may well dissociate the lithium salt in the electrolyte. Thus, the ethylene carbonate and propylene carbonate may be used. Since an electrolyte solution having high electrical conductivity may be prepared when the above cyclic carbonate is mixed with low viscosity, low dielectric constant linear carbonate, such as dimethyl carbonate and diethyl carbonate, in an appropriate ratio, the ethylene carbonate and propylene carbonate, for example, may be used.

Furthermore, as the ether compound among the organic solvents, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

As the ester compound among the organic solvents, any one selected from the group consisting of liner esters such as methyl acetate, ethyl acetate, propyl acetate, methyl propionate, ethyl propionate, propyl propionate, and butyl propionate; and cyclic ester compounds such as γ-butyrolactone, γ-valerolactone, γ-caprolactone, σ-valerolactone, and ε-caprolactone, or a mixture of two or more thereof may be used, but the present invention is not limited thereto.

Also, according to an embodiment of the present invention,
there is provided a lithium secondary battery including a positive electrode, a negative electrode, a separator disposed between the positive electrode and the negative electrode, and a non-aqueous electrolyte solution, wherein the above non-aqueous electrolyte solution includes the non-aqueous electrolyte solution of the present invention.

Specifically, the lithium secondary battery of the present invention may be prepared by injecting the non-aqueous electrolyte solution of the present invention into an electrode assembly which is composed of the positive electrode, the negative electrode, and the separator disposed between the positive electrode and the negative electrode. In this case, those typically used in the preparation of the lithium secondary battery may all be used as the positive electrode, the negative electrode, and the separator which constitute the electrode assembly.

In this case, the positive electrode may be prepared by coating a positive electrode material mixture including a positive electrode active material, a binder, a conductive agent, and a solvent on a positive electrode collector.

The positive electrode collector is not particularly limited so long as it has high conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included. Among these materials, in terms of the improvement of the capacity characteristics and stability of the battery, the lithium composite metal oxide may include $LiCoO_2$, $LiMnO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}CO_{0.1})O_2$), or lithium nickel cobalt aluminum oxide (e.g., $Li(Ni_{0.8}Co_{0.15}Al_{0.05})O_2$, etc.). In consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 wt % to 99 wt % based on a total weight of the positive electrode material mixture.

The binder is a component that assists in the binding between the active material and the conductive agent and in the binding with the current collector, wherein the binder is commonly added in an amount of 1 wt % to 30 wt % based on the total weight of the positive electrode material mixture. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is commonly added in an amount of 1 wt % to 30 wt % based on the total weight of the positive electrode material mixture.

Any conductive agent may be used without particular limitation so long as it has suitable conductivity without causing adverse chemical changes in the battery, and, for example, a conductive material such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included so that a concentration of solid content including the positive electrode active material as well as selectively the binder and the conductive agent is in a range of 50 wt % to 95 wt %, for example, 70 wt % to 90 wt %.

Also, the negative electrode, for example, may be prepared by coating a negative electrode material mixture including a negative electrode active material, a binder, a conductive agent, and a solvent on a negative electrode collector.

The negative electrode collector generally has a thickness of 3 μm to 500 μm. The negative electrode collector is not particularly limited so long as it has conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, like the positive electrode collector, the negative electrode collector may have fine surface roughness to improve bonding strength with the negative electrode active material. The negative electrode collector may have various shapes such as a film, a sheet, a foil, a net, a porous body, a foam body, a non-woven fabric body, and the like.

The negative electrode active material may include at least one negative electrode active material selected from the group consisting of natural graphite, artificial graphite, a carbonaceous material; lithium-containing titanium composite oxide (LTO); metals (Me) such as silicon (Si), tin (Sn), lithium (Li), zinc (Zn), Mg, cadmium (Cd), cerium (Ce), nickel (Ni), or Fe; alloys composed of the metals (Me); oxides of the metals (Me); and composites of the metals (Me) and carbon.

The negative electrode active material may be included in an amount of 80 wt % to 99 wt % based on a total weight of the negative electrode material mixture.

The binder is a component that assists in the binding between the conductive agent, the active material, and the current collector, wherein the binder is commonly added in an amount of 1 wt % to 30 wt % based on the total weight of the negative electrode material mixture. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is a component for further improving the conductivity of the negative electrode active material, wherein the conductive agent may be added in an amount of 1 wt % to 20 wt % based on the total weight of the negative electrode material mixture. Any conductive agent may be used without particular limitation so long as it has suitable conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

The solvent may include an organic solvent, such as N-methyl-2-pyrrolidone (NMP), and may be used in an amount such that desirable viscosity is obtained when the negative electrode active material as well as selectively the binder and the conductive agent are included. For example, the solvent may be included so that a concentration of solid content including the negative electrode active material as well as selectively the binder and the conductive agent is in a range of 50 wt % to 95 wt %, for example, 70 wt % to 90 wt %.

Also, a typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, and a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Non-Aqueous Electrolyte Solution Preparation)

Fluoroethylene carbonate (FEC), propylene carbonate (PC), and ethylmethyl carbonate (EMC) were mixed in a ratio of 30:10:60 (vol %) to prepare an organic solvent mixed solution. Thereafter, 0.5 wt % of the compound represented by Formula 1a was added based on a total weight of the prepared organic solvent mixed solution, and a non-aqueous electrolyte solution was prepared by dissolving $LiPF_6$ in the mixed solution to obtain a $LiPF_6$ concentration of 1 M.

(Positive Electrode Preparation)

40 parts by weight of a mixture, in which a positive electrode active material (lithium cobalt composite oxide ($LiCO_2$)), a conductive agent (carbon black), and a binder (polyvinylidene fluoride (PVDF)) were mixed in a ratio of 90:5:5 (wt %), was added based on 100 parts by weight of N-methyl-2-pyrrolidone (NMP), as a solvent, to prepare a positive electrode material mixture. A 100 μm thick positive electrode collector (Al thin film) was coated with the positive electrode material mixture, dried, and roll-pressed to prepare a positive electrode.

(Negative Electrode Preparation)

90 parts by weight of a mixture, in which natural graphite, a binder (PVDF), and a conductive agent (carbon black) were mixed in a ratio of 95:2:3 (wt %), was added based on 100 parts by weight of N-methyl-2-pyrrolidone (NMP), as a solvent, to prepare a negative electrode material mixture. A 90 μm thick negative electrode collector (Cu thin film) was coated with the negative electrode material mixture, dried, and roll-pressed to prepare a negative electrode.

(Secondary Battery Preparation)

An electrode assembly was prepared by stacking the positive electrode and negative electrode prepared by the above-described method with a polyethylene porous film, and a lithium secondary battery was then prepared by injecting the prepared non-aqueous electrolyte solution thereinto.

Example 2

A non-aqueous electrolyte solution and a lithium secondary battery including the same were prepared in the same manner as in Example 1 except that the compound of Formula 1b, instead of the compound of Formula 1a, was included as an additive for a non-aqueous electrolyte solution in the preparation of the non-aqueous electrolyte solution in Example 1.

Example 3

A non-aqueous electrolyte solution and a lithium secondary battery including the same were prepared in the same manner as in Example 1 except that the compound of Formula 1c, instead of the compound of Formula 1a, was included as an additive for a non-aqueous electrolyte solution in the preparation of the non-aqueous electrolyte solution in Example 1.

Example 4

A non-aqueous electrolyte solution and a lithium secondary battery including the same were prepared in the same manner as in Example 1 except that the compound of Formula 2a, instead of the compound of Formula 1a, was included as an additive for a non-aqueous electrolyte solution in the preparation of the non-aqueous electrolyte solution in Example 1.

Example 5

A non-aqueous electrolyte solution and a lithium secondary battery including the same were prepared in the same manner as in Example 1 except that 5 wt % of the compound of Formula 1a was included in the preparation of the non-aqueous electrolyte solution in Example 1.

Example 6

A non-aqueous electrolyte solution and a lithium secondary battery including the same were prepared in the same manner as in Example 1 except that 5 wt % of the compound of Formula 1c was included in the preparation of the non-aqueous electrolyte solution in Example 3.

Example 7

A non-aqueous electrolyte solution and a battery including the same were prepared in the same manner as in Example 1 except that 7 wt % of the compound of Formula 1a was included as an additive in the preparation of the non-aqueous electrolyte solution in Example 1.

Example 8

A non-aqueous electrolyte solution and a battery including the same were prepared in the same manner as in Example 3 except that 7 wt % of the compound of Formula 1c was included as an additive in the preparation of the non-aqueous electrolyte solution in Example 3.

Example 9

A non-aqueous electrolyte solution and a battery including the same were prepared in the same manner as in Example 4 except that 7 wt % of the compound of Formula 2a was included as an additive in the preparation of the non-aqueous electrolyte solution in Example 4.

Comparative Example 1

A non-aqueous electrolyte solution and a lithium secondary battery including the same were prepared in the same manner as in Example 1 except that an additive for a non-aqueous electrolyte solution was not included in the preparation of the non-aqueous electrolyte solution in Example 1.

Comparative Example 2

A non-aqueous electrolyte solution and a lithium secondary battery including the same were prepared in the same manner as in Example 1 except that a compound of the following Formula 3a, instead of the compound of Formula 1a, was included as an additive for a non-aqueous electrolyte solution in the preparation of the non-aqueous electrolyte solution in Example 1.

[Formula 3a]

Comparative Example 3

A non-aqueous electrolyte solution and a lithium secondary battery including the same were prepared in the same manner as in Example 1 except that a compound of the following Formula 3b, instead of the compound of Formula 1a, was included as an additive for a non-aqueous electrolyte solution in the preparation of the non-aqueous electrolyte solution in Example 1.

[Formula 3b]

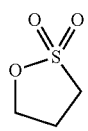

Comparative Example 4

A non-aqueous electrolyte solution and a lithium secondary battery including the same were prepared in the same manner as in Example 1 except that 0.5 wt % of each of the compounds of Formulae 3a and 3b, instead of the compound of Formula 1a, was included as an additive for a non-aqueous electrolyte solution in the preparation of the non-aqueous electrolyte solution in Example 1.

EXPERIMENTAL EXAMPLES

Experimental Example 1: Overcharge Safety Measurement

The batteries prepared in Examples 1 to 9 and Comparative Examples 1 to 4 were charged at a 0.8 C rate to 4.35 V under a constant current/constant voltage condition, cut-off charged at 0.05 C, and discharged at 0.5 C to a voltage of 3.0 V.

Next, the batteries were overcharged at 0.8 C to a voltage of 10 V. The battery was evaluated as "OK" only when there were no ignition, explosion, and electrolyte leakage of the battery after the overcharge, the battery was evaluated as "Δ" when there was ignition or electrolyte leakage of some batteries, and the battery was evaluated as "x" when the ignition or electrolyte leakage of the battery was intensified. The results thereof are presented in Table 1 below.

Experimental Example 2: High-Temperature Storage Performance Measurement

The batteries prepared in Examples 1 to 9 and Comparative Examples 1 to 4 were charged at a 0.8 C rate to 4.35 V under a constant current/constant voltage condition, cut-off charged at 0.05 C, and discharged at 0.5 C to a voltage of 3.0 V (initial discharge capacity). Subsequently, the batteries were charged at a 0.8 C rate to 4.35 V under a constant current/constant voltage condition, cut-off charged at 0.05 C, and stored at 60° C. for 2 weeks. Thereafter, the batteries were discharged at 0.5 C to a voltage of 3.0 V at room temperature and discharge capacities were measured (residual discharge capacities). Subsequently, the batteries were charged at a 0.8 C rate to 4.35 V under a constant current/constant voltage condition, cut-off charged at 0.05 C, and discharged at 0.5 C to a voltage of 3.0 V to measure discharge capacities (recovery discharge capacities).

Subsequently, results of the overcharge safeties, residual discharge capacities, and recovery discharge capacities of the secondary batteries prepared in Examples 1 to 9 and Comparative Examples 1 to 4, which were obtained by the experiments, are presented in Table 1 below. In this case, the residual discharge capacities and the recovery discharge capacities were expressed as a percentage (%) relative to the initial discharge capacity. Also, life characteristics of the secondary batteries prepared in Examples 1 to 6 and Comparative Examples 1 to 4, which were obtained by the experiments, are presented in FIG. 1.

TABLE 1

| | Additive | | | Residual discharge capacity (%) | Recovery discharge capacity (%) |
|---|---|---|---|---|---|
| | Compound | Amount used | Overcharge safety | | |
| Example 1 | 1a | 0.5 wt % | OK | 85 | 95 |
| Example 2 | 1b | 0.5 wt % | OK | 83 | 97 |
| Example 3 | 1c | 0.5 wt % | OK | 80 | 95 |
| Example 4 | 2a | 0.5 wt % | OK | 87 | 94 |
| Example 5 | 1a | 5 wt % | OK | 87 | 97 |
| Example 6 | 1c | 5 wt % | OK | 88 | 97 |
| Example 7 | 1a | 7 wt % | — | insoluble | insoluble |
| Example 8 | 1c | 7 wt % | — | insoluble | insoluble |
| Example 9 | 2a | 7 wt % | — | insoluble | insoluble |
| Comparative Example 1 | — | — | X | 67 | 83 |
| Comparative Example 2 | 3a | 0.5 wt % | Δ | 70 | 80 |
| Comparative Example 3 | 3b | 0.5 wt % | X | 80 | 87 |
| Comparative Example 4 | 3a 3b | 0.5 wt % 0.5 wt % | Δ | 78 | 85 |

As illustrated in Table 1, with respect to the secondary batteries of Examples 1 to 6 including the additive for a non-aqueous electrolyte solution of the present invention, since capacities were maintained even if a cycle proceeded at high temperature, it may be understood that both the residual discharge capacities and the recovery discharge capacities were better than those of the secondary battery of Comparative Example 1 which did not include the additive for a non-aqueous electrolyte solution. Also, it may be understood that cycle life characteristics were excellent as illustrate in FIG. 1. With respect to the additives for a non-aqueous electrolyte solution including the compounds represented by Formulae 1a to 1c or Formula 2a of the present invention, it was predicted that thermal stability of a film was also improved while both a triazine functional group and a S(=O) functional group, which were included in a structure of the compound, participated a film formation reaction.

In contrast, with respect to the secondary battery of Comparative Example 2 including the compound of Formula 3a, it may be understood that both the residual discharge capacity and the recovery discharge capacity were reduced as the cycle at high temperature proceeded (See FIG. 1).

Also, with respect to the secondary battery of Comparative Example 3 including the compound of Formula 3b, the residual and recovery charge capacities were not significantly reduced, but initial life characteristics may be poor and the overcharge safety may be particularly low (See FIG. 1).

Furthermore, with respect to the secondary battery of Comparative Example 4 including both the compounds of Formulae 3a and 3b, since resistance was increased, it may be understood that both the residual charge capacity and the recovery charge capacity were reduced as the cycle at high temperature proceeded like the secondary battery of Comparative Example 2 (See FIG. 1).

With respect to the secondary batteries of Examples 7 to 9 including an excessive amount of the additive for a non-aqueous electrolyte solution, since solubility is low, there were difficulties in measuring high-temperature storage performance characteristics.

Experimental Example 3: Measurement of Alternative-Current (AC) Impedance (ACI)

The lithium secondary batteries of Examples 1 to 6 and Comparative Example 4 at a state of charge (SOC) of 0% were left standing at a temperature of 25° C. for 1 hour, and AC impedances of the batteries were then measured while scanning was performed from 50 mHz to 100 kHz. In this case, an amplitude of the alternating current was 10 mV, and a direct current (DC) potential of the battery was 3.74 V. The results thereof are presented in FIG. 2.

Figure 2:
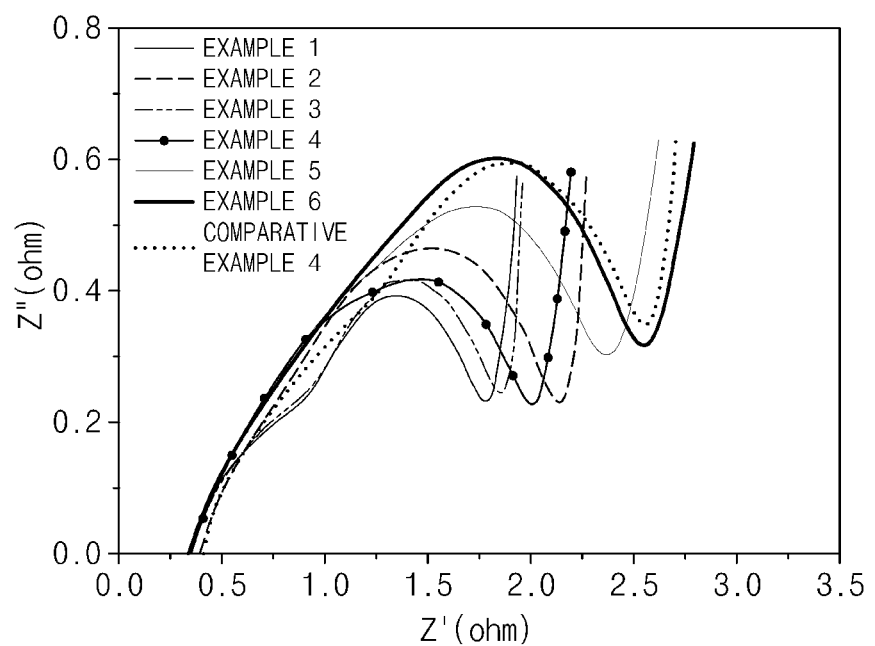
FIG. 2 is a graph illustrating measurement results of AC impedances of lithium secondary batteries according to Experimental Example 2 of the present invention.

In a graph of FIG. 2, intersection with X-axis denotes Ohm resistance of the battery, and a half circle of the latter portion of the graph denotes resistance due to the SEI formed on the surface of the electrode plate. That is, it denotes that the smaller the diameter of the half circle is, the smaller the resistance caused by the SEI is.

As illustrated in FIG. 2, it may be understood that resistance of Comparative Example 4, in which the amount added was greater than those of Examples 1 to 6, was significantly increased. Also, with respect to Comparative Example 4, it may be understood that the amount of dissolved Co was large and lifetime was reduced.

Furthermore, among the secondary batteries of Examples 1 to 6, resistances of the secondary batteries of Examples 1, 3, and 4, in which the non-aqueous solutions including the compounds represented by Formulae 1a, 1c, and 2a were used, were slightly further reduced in comparison to that of the secondary battery of Example 2.

Also, with respect to the secondary batteries of Examples 5 and 6 in which the amounts of the additives for a non-aqueous solution were increased in comparison to those of the secondary batteries of Examples 1 to 4, it may be understood that a phenomenon occurred in which the resistance was increased with an increase in the amount of the additive.

That is, the secondary batteries of Examples 5 and 6 exhibited similar resistance to the secondary battery of Comparative Example 4, but had improved high-temperature storage performance and overcharge safety in comparison to the secondary battery of Comparative Example 4 as described above.

The invention claimed is:

1. An additive for a non-aqueous electrolyte solution, the additive comprising at least one compound selected from the group consisting of compounds represented by Formulae 1 and 2:

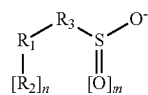

[Formula 1]

in Formula 1,

R$_1$ is a substituted or unsubstituted alkylene group having 1 to 5 carbon atoms; a substituted or unsubstituted cycloalkylene group having 3 to 8 carbon atoms; a substituted or unsubstituted heterocycloalkylene group having 3 to 8 atoms which includes at least one heteroatom; or a substituted or unsubstituted heterocycloalkenylene group having 5 to 8 atoms which includes at least one heteroatom;

R$_2$ is a substituted or unsubstituted alkyl group having 1 to 5 carbon atoms; a substituted or unsubstituted cycloalkyl group having 3 to 8 carbon atoms; a substituted or unsubstituted heterocycloalkyl group having 3 to 8 atoms which includes at least one heteroatom; or a substituted or unsubstituted heterocycloalkenyl group having 5 to 8 atoms which includes at least one heteroatom;

the heteroatom is at least one selected from nitrogen (N) or oxygen (O), when m is 1, R$_3$ is a substituted or unsubstituted alkylene group having 2 to 6 carbon atoms, and when m is 2, R$_3$ is a substituted or unsubstituted alkenylene group having 2 or 6 carbon atoms which has at least one double bond;

n is an integer of 0 or 1, and m is an integer of 1 or 2,

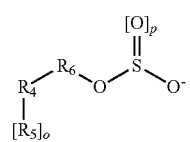

[Formula 2]

in Formula 2,

R$_4$ is a substituted or unsubstituted alkylene group having 1 to 5 carbon atoms; a substituted or unsubstituted cycloalkylene group having 3 to 8 carbon atoms; a substituted or unsubstituted heterocycloalkylene group having 3 to 8 atoms which includes at least one heteroatom; or a substituted or unsubstituted heterocycloalkenylene group having 5 to 8 carbon atoms which includes at least one heteroatom;

R$_5$ is a substituted or unsubstituted alkyl group having 1 to 5 carbon atoms; a substituted or unsubstituted cycloalkyl group having 3 to 8 carbon atoms; a substituted or unsubstituted heterocycloalkyl group having 3 to 8 atoms which includes at least one heteroatom; or a substituted or unsubstituted heterocycloalkenyl group having 5 to 8 atoms which includes at least one heteroatom;

the heteroatom is at least one selected from nitrogen (N) or oxygen (O),

R$_6$ is a substituted or unsubstituted alkylene group having 2 to 6 carbon atoms, or a substituted or unsubstituted alkenylene group having 2 to 6 carbon atoms which has at least one double bond, o is an integer of 0 or 1, and p is an integer of 1 or 2.

2. The additive for a non-aqueous electrolyte solution of claim 1, wherein, in Formula 1 or 2, R$_1$ and R$_4$ are each independently a substituted or unsubstituted heterocycloalkenyl group having 5 to 8 atoms which includes at least one heteroatom, wherein n and o are 0.

3. The additive for a non-aqueous electrolyte solution of claim 1, comprising at least one compound selected from the group consisting of compounds represented by Formulae 1a and 1c:

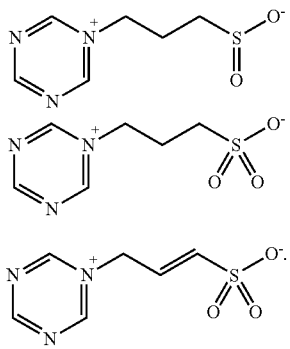

[Formula 1a]

[Formula 1b]

[Formula 1c]

4. The additive for a non-aqueous electrolyte solution of claim 1, comprising a compound represented by Formula 2a:

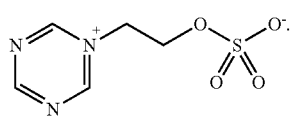

[Formula 2a]

5. A non-aqueous electrolyte solution for a lithium secondary battery, the non-aqueous electrolyte solution comprising:
an ionizable lithium salt;
an organic solvent; and
an additive for a non-aqueous electrolyte solution,
wherein the additive for a non-aqueous electrolyte solution comprises at least one compound selected from the group consisting of compounds represented by Formulae 1 and 2:

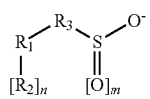

[Formula 1]

in Formula 1,
$R_1$ is a substituted or unsubstituted alkylene group having 1 to 5 carbon atoms; a substituted or unsubstituted cycloalkylene group having 3 to 8 carbon atoms; a substituted or unsubstituted heterocycloalkylene group having 3 to 8 atoms which includes at least one heteroatom; or a substituted or unsubstituted heterocycloalkenylene group having 5 to 8 atoms which includes at least one heteroatom;
$R_2$ is a substituted or unsubstituted alkyl group having 1 to 5 carbon atoms; a substituted or unsubstituted cycloalkyl group having 3 to 8 carbon atoms; a substituted or unsubstituted heterocycloalkyl group having 3 to 8 atoms which includes at least one heteroatom; or a substituted or unsubstituted heterocycloalkenyl group having 5 to 8 atoms which includes at least one heteroatom;
the heteroatom is at least one selected from nitrogen (N) or oxygen (O), when m is 1, $R_3$ is a substituted or unsubstituted alkylene group having 2 to 6 carbon atoms, and when m is 2, $R_3$ is a substituted or unsubstituted alkenylene group having 2 or 6 carbon atoms which has at least one double bond;
n is an integer of 0 or 1, and m is an integer of 1 or 2,

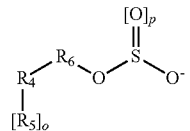

[Formula 2]

in Formula 2,
$R_4$ is a substituted or unsubstituted alkylene group having 1 to 5 carbon atoms; a substituted or unsubstituted cycloalkylene group having 3 to 8 carbon atoms; a substituted or unsubstituted heterocycloalkylene group having 3 to 8 atoms which includes at least one heteroatom; or a substituted or unsubstituted heterocycloalkenylene group having 5 to 8 atoms which includes at least one heteroatom;
$R_5$ is a substituted or unsubstituted alkyl group having 1 to 5 carbon atoms; a substituted or unsubstituted cycloalkyl group having 3 to 8 carbon atoms; a substituted or unsubstituted heterocycloalkyl group having 3 to 8 atoms which includes at least one heteroatom; or a substituted or unsubstituted heterocycloalkenyl group having 5 to 8 atoms which includes at least one heteroatom;
the heteroatom is at least one selected from nitrogen (N) or oxygen (O),
$R_6$ is a substituted or unsubstituted alkylene group having 2 to 6 carbon atoms, or a substituted or unsubstituted alkenylene group having 2 to 6 carbon atoms which has at least one double bond,
o is an integer of 0 or 1, and
p is an integer of 1 or 2.

6. The non-aqueous electrolyte solution for a lithium secondary battery of claim 5, wherein the additive for a non-aqueous electrolyte solution comprises at least one compound selected from the group consisting of compounds represented by Formulae 1a and 1c:

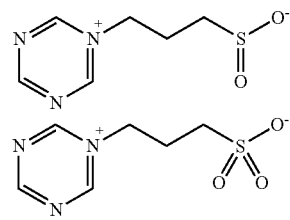

[Formula 1a]

[Formula 1c]

7. The non-aqueous electrolyte solution for a lithium secondary battery of claim 5, wherein the additive for a non-aqueous electrolyte solution comprises a compound represented by Formula 2a:

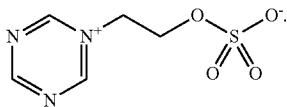

[Formula 2a]

8. The non-aqueous electrolyte solution for a lithium secondary battery of claim 5, wherein the additive for a non-aqueous electrolyte solution is included in an amount of 0.5 wt % to 6 wt % based on a total amount of the non-aqueous electrolyte solution.

9. The non-aqueous electrolyte solution for a lithium secondary battery of claim 5, wherein the additive for a non-aqueous electrolyte solution is included in an amount of 1 wt % to 5 wt % based on a total amount of the non-aqueous electrolyte solution.

10. The non-aqueous electrolyte solution for a lithium secondary battery of claim 5, wherein the lithium salt comprises $Li^+$, as a cation, and any one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $ASF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2$ $(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion.

11. The non-aqueous electrolyte solution for a lithium secondary battery of claim 5, wherein the organic solvent comprises any one selected from the group consisting of an ether compound, an ester compound, an amide compound, a linear carbonate compound, or a cyclic carbonate compound, or a mixture of two or more thereof.

12. A lithium secondary battery comprising:
a negative electrode;
a positive electrode;
a separator disposed between the negative electrode and the positive electrode; and
a non-aqueous electrolyte solution, wherein the non-aqueous electrolyte solution comprises the non-aqueous electrolyte solution for a lithium secondary battery of claim 5.

* * * * *